United States Patent
Gutierrez et al.

(10) Patent No.: US 10,815,430 B2
(45) Date of Patent: Oct. 27, 2020

(54) PROCESS FOR PURIFYING RENEWABLE FEEDSTOCK COMPRISING TRIGLYCERIDES

(71) Applicant: UPM-KYMMENE CORPORATION, Helsinki (FI)

(72) Inventors: Andrea Gutierrez, Espoo (FI); Thomas Björklöf, Helsinki (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 16/713,233

(22) Filed: Dec. 13, 2019

(65) Prior Publication Data
US 2020/0190407 A1    Jun. 18, 2020

(30) Foreign Application Priority Data
Dec. 14, 2018 (FI) ..................................... 20186085

(51) Int. Cl.
*C10G 3/00* (2006.01)

(52) U.S. Cl.
CPC ....... *C10G 3/50* (2013.01); *C10G 2300/1014* (2013.01); *C10G 2300/4006* (2013.01); *C10G 2300/4012* (2013.01); *C10G 2400/04* (2013.01)

(58) Field of Classification Search
CPC combination set(s) only.
See application file for complete search history.

(56) References Cited

U.S. PATENT DOCUMENTS

| 2011/0047866 | A1* | 3/2011 | Bao | C10G 45/08 44/605 |
|---|---|---|---|---|
| 2011/0138680 | A1 | 6/2011 | Dandeu et al. | |
| 2016/0214028 | A1 | 7/2016 | Coppola et al. | |
| 2016/0244394 | A1* | 8/2016 | Bieser | C07C 51/09 |
| 2017/0107449 | A1 | 4/2017 | Hruschka et al. | |

FOREIGN PATENT DOCUMENTS

| FI | 124885 B | 3/2015 |
|---|---|---|
| WO | 2009072468 A1 | 6/2009 |
| WO | 2010021753 A1 | 2/2010 |
| WO | 2010030196 A1 | 3/2010 |
| WO | 2011138957 A1 | 11/2011 |

(Continued)

OTHER PUBLICATIONS

Search Report for the corresponding Finnish Patent Application No. 20186085; Date of Filing: Dec. 14, 2018; dated Aug. 26, 2019; 2 pages.

(Continued)

*Primary Examiner* — Ellen M McAvoy
*Assistant Examiner* — Chantel L Graham
(74) *Attorney, Agent, or Firm* — Cantor Colburn LLP

(57) ABSTRACT

The present invention relates to a process for purifying renewable feedstock comprising triglycerides, said process comprising the steps, where the renewable feedstock comprising triglycerides, comprising at least one plant oil originating from a plant of the family Brassicaceae, is treated with an aqueous medium to obtain a mixture, and a first stream comprising water and a second stream comprising triglycerides are separated from said mixture, and the second stream is obtained as purified renewable feedstock.

26 Claims, 3 Drawing Sheets

(56) References Cited

FOREIGN PATENT DOCUMENTS

| | | |
|---|---|---|
| WO | 2015050656 A2 | 4/2015 |
| WO | 2018060302 A1 | 4/2018 |
| WO | 2018060324 A1 | 4/2018 |

OTHER PUBLICATIONS

Communication of Acceptance under section 29a of Patents Decree, Finnish Patent and Registration Office for the corresponding Finnish Patent Application No. 20186085; dated Aug. 26, 2019; 6 pages.

\* cited by examiner

PROCESS FOR PURIFYING RENEWABLE FEEDSTOCK COMPRISING TRIGLYCERIDES

CROSS-REFERENCE TO RELATED APPLICATION

This application claims benefit of Finnish Patent Application No. 20186085 filed on Dec. 14, 2018, which is incorporated by reference herein in its entirety.

FIELD OF THE INVENTION

The present invention relates to a process for purifying renewable feedstock comprising triglycerides. The feedstock comprising triglycerides, originating from renewable materials, is subjected to purification where impurities are removed. The purified feedstock comprising triglycerides may be converted to products comprising hydrocarbons, suitable as fuels or fuel components. The purified feedstock comprising triglycerides is suitable as feed for biofuel production.

BACKGROUND OF THE INVENTION

Biofuels is a growth industry and commercial transportation is facing pressure to reduce its carbon footprint. Biofuels provide a direct means to meet the commitments to reduce emissions.

Biofuels are typically manufactured from feedstock originating from renewable sources, including oils and fats obtained from plants, animals, algal materials and fish. These feeds contain varying amounts of contaminants, such as gums, phospholipids and other phosphorus compounds, metals and metal compounds, which are, for example, deleterious to converting catalysts.

Hydrotreatment is a catalytic process that it is used in the production of renewable fuels. In this process, hydrogen is used to remove heteroatoms like N, O, and sulfur and to saturate double bonds. However, the catalysts used can be deactivated by impurities present in the feed. Thus, pretreatment of feeds is required. In the pretreatment, substances that deactivate the hydrotreatment catalyst are removed.

Plant oils and animal fats are conventionally pretreated with degumming, evaporation and/or bleaching processes, which are designed to remove or at least minimize the content of contaminants in said materials. Lye is often used for saponification of any free fatty acids present whereby they are separated alongside with impurities, such as phosphorus compounds. Bleaching generates significant amounts of spent bleaching earth as waste. Further, both processes entail a yield loss, as oil is removed with the impurities.

Despite the ongoing research and development in the processing of renewable feedstocks and manufacture of fuels, there is still a need to provide an improved process for purifying renewable feedstock comprising triglycerides, to provide purified feedstock, which is suitable for converting to valuable chemicals, such as hydrocarbons suitable as fuels or fuel blending components.

SUMMARY OF THE INVENTION

An object of the invention is to provide a process for purifying renewable feedstock comprising triglycerides.

One aspect is a process for purifying renewable feedstock comprising triglycerides, where said process comprises the steps, where the renewable feedstock comprising triglycerides comprises at least one plant oil originating from a plant of the family Brassicaceae, and said renewable feedstock comprising triglycerides is treated with an aqueous medium, at a temperature from 140 to 195° C., under a pressure from 0.1 to 70 bar (abs), and where the ratio of the feedstock comprising triglycerides to the aqueous medium is from 1:5 to 5:1, respectively, to obtain a mixture, and a first stream comprising water and a second stream comprising triglycerides are separated from said mixture, and the second stream is obtained as purified renewable feedstock.

Another aspect provides purified feedstock comprising triglycerides obtained by said process.

Characteristic features of the invention are presented in the appended claims.

Definitions

Triglycerides, also known as acylglycerols, refer here to esters formed from glycerol and C4-C26 fatty acids, linked by acylglyceride linkage between the fatty acid and three hydroxyl groups of glycerol, typically present in feedstocks originating from renewable sources.

Acylglycerols refer here to esters formed from glycerol and C1-C26 fatty acids, linked by acylglyceride linkage between the fatty acid and at least one of the hydroxyl groups of glycerol, typically present in feedstocks originating from renewable sources.

The term "first stream" refers here to a stream comprising water. The first stream is an aqueous stream or aqueous phase, which is separated from a mixture obtained in the process, where the renewable feedstock oil is treated with the aqueous medium. The first stream comprises water and it may comprise water soluble and water miscible compounds, particularly impurities separated from the renewable feedstock.

The term "second stream" refers here to an oil stream or oil phase, which is separated from a mixture obtained in the step, where the renewable feedstock is treated with the aqueous medium. The second stream comprises triglycerides.

Transportation fuels refer here to fractions or cuts or blends of hydrocarbons having distillation curves standardized for fuels, such as for diesel fuel (middle distillate from 160 to 380° C., according to EN 590), gasoline (40-210° C., according to EN 228), aviation fuel (160 to 300° C., according to ASTM D-1655 jet fuel), kerosene, naphtha, etc. Liquid fuels are hydrocarbons having distillation curves standardized for fuels, such as transportation fuels.

The term "biofuel" refers here to liquid fuels obtained from renewable feedstock, e.g. feedstock of biological origin.

DETAILED DESCRIPTION OF THE INVENTION

Figure 1:
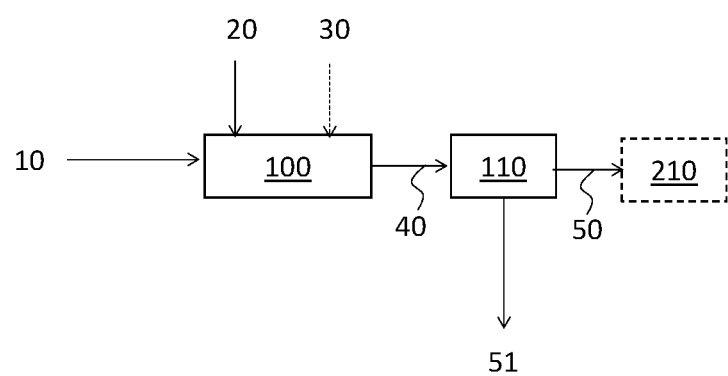
FIG. 1 is a schematic flow diagram representing one embodiment of the purification process.

An industrially effective and sustainable process for purifying renewable feedstock comprising triglycerides is provided, where the various impurities, including phosphorus, alkali metals, alkaline earth metals and other metals can be removed from the feedstock effectively and economically, while maintaining the structure of valuable compounds. The purified renewable feedstock is particularly suitable as feedstock for hydroprocessing in biofuel manufacture. The purification process releases effectively and rapidly moieties containing particularly phosphorus, alkali metals, alkaline earth metals and other metals from compounds present in the feedstock, without breaking or degrading valuable feed materials or without substantially effecting hydrolysis of triglycerides, or at least maintaining said hydrolysis on a very negligible level. The valuable organic compounds are maintained in the oil phase, which is confirmed by low total organic carbon (TOC) in the aqueous phase, where the impurities are typically present in the aqueous phase. The process is suitable for purifying plant oil originating from a plant of the family Brassicaceae, particularly carinata oil, and it provides an improved alternative for degumming and bleaching of oils. Prior art methods utilize typically degumming and bleaching, which result in forming of significant amounts of waste and losses of valuable materials. These drawbacks can be avoided or at least significantly decreased with the present purification method.

One aspect is a process for purifying renewable feedstock comprising triglycerides, where said process comprises the steps, where the renewable feedstock comprising triglycerides comprises at least one plant oil originating from a plant of the family Brassicaceae, and said renewable feedstock comprising triglycerides is treated with an aqueous medium, at a temperature from 140 to 195° C., under a pressure from 0.1 to 70 bar (abs), and where the ratio of the feedstock comprising triglycerides to the aqueous medium is from 1:5 to 5:1, respectively, to obtain a mixture, and a first stream comprising water and a second stream comprising triglycerides are separated from said mixture, and the second stream is obtained as purified renewable feedstock.

In an embodiment, the purified renewable feedstock comprises not more than 50 mg/kg phosphorus, calculated as elemental phosphorus.

In a preferable embodiment, the purified renewable feedstock comprises not more than 40 mg/kg phosphorus, calculated as elemental phosphorus, more preferably not more than 10 mg/kg, even more preferably not more than 5 mg/kg phosphorus.

In an embodiment, the purified renewable feedstock comprises not more than 50 mg/kg alkali metals, alkaline earth metals, metals of the groups VIIB and VIIIB of the Periodic table of elements, or combinations thereof, calculated as elemental metals in total.

In an embodiment, the purified renewable feedstock comprises not more than 10 mg/kg alkali metals, alkaline earth metals, metals of the groups VIIB and VIIIB of the Periodic table of elements, or combinations thereof calculated as elemental metals, more preferably not more than 5 mg/kg.

In an embodiment, the first stream comprising water comprises not more than 2000 mg/kg of total organic carbon, preferably not more than 500 mg/kg. The total organic carbon (TOC) is measured using SFS-EN 1484 standard method.

In an embodiment, the purified renewable feedstock comprises not more than 50 mg/kg phosphorus and not more than 50 mg/kg alkali metals, alkaline earth metals, metals of the groups VIIB and VIIIB of the Periodic table of elements, or combinations thereof, in total and the first stream comprising water comprises not more than 2000 mg/kg total organic carbon.

Accordingly, the renewable feedstock comprising at least one plant oil originating from a plant of the family Brassicaceae, is subjected to purification with an aqueous medium, whereby a first stream comprising water, phosphorus containing moieties, alkali metals, alkaline earth metals, metals of the groups VIIB and VIIIB of the Periodic table of elements (other metals), such as Fe and Mn, and possibly some water soluble or water miscible organic compounds are separated from a second stream comprising triglycerides and some residual water. The second stream comprising triglycerides may also comprise some monoglycerides, diglycerides, fatty acids and unsaponifiables, if contained in the feedstock.

In an embodiment, the aqueous medium comprises an acid selected from sulfuric acid and C1-C10 organic acids.

In an embodiment, the second stream comprising triglycerides may be directed to a hydroprocessing step.

In FIG. 1 plant oil originating from a plant of the family Brassicaceae (carinata oil) (10) is fed to purification step (100) and treated with an aqueous medium (20), optionally in the presence of steam (30), whereby a mixture (40) is obtained. The mixture (40) is directed to a separation step (110). A first stream (aqueous stream) comprising impurities (51) is separated in the separation step (110) and a second stream comprising triglycerides (50) is obtained. The second stream comprising triglycerides (50) may optionally be directed to storage in a storage tank (210).

Figure 2:
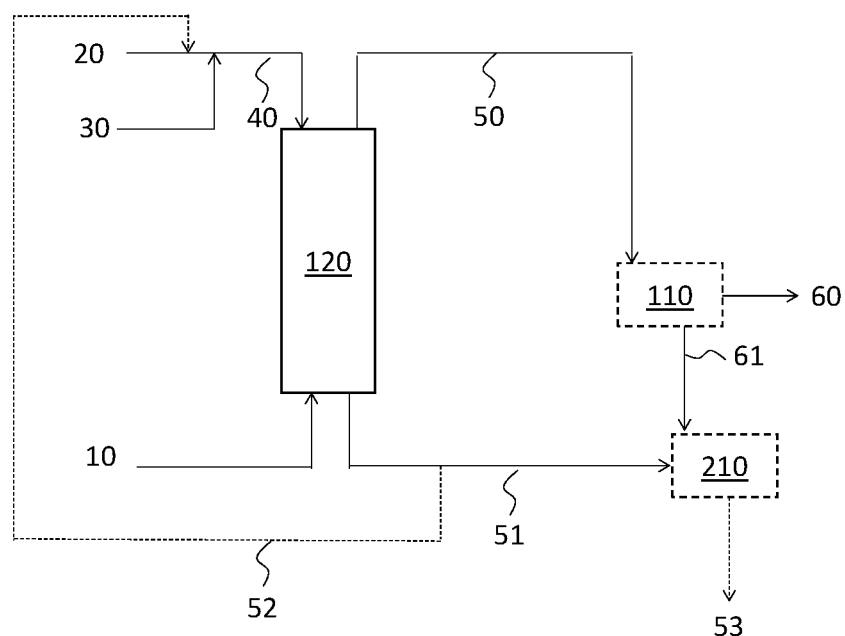
FIG. 2 is a schematic flow diagram representing another embodiment of the purification process.

In FIG. 2 an acid (30) is fed to an aqueous medium (20) to obtain an aqueous medium comprising an acid (40). Said aqueous medium comprising an acid (40) and plant oil originating from a plant of the family Brassicaceae (carinata oil) (10) are fed to a purification step (120), where purification and separation are carried out, suitably in an extraction column, by treating carinata oil (10) with said aqueous medium comprising an acid (40), optionally in the presence of steam (not shown in the figure). A first stream (aqueous stream) comprising impurities (51) is obtained and optionally directed to waste water treatment (210) and a second stream comprising triglycerides acids (50) is obtained. Said stream (50) is optionally directed to drying (110). In the drying (110) water (61) is separated and optionally directed to waste water treatment (210) to provide purified water (53) and a dried second stream comprising triglycerides (60) is obtained. Optionally, at least part (52) of the aqueous stream (51) may be recirculated to the aqueous medium (20). The dried second stream comprising triglycerides (60) may optionally be directed to storage and/or hydroprocessing (not shown in the figure).

Figure 3:
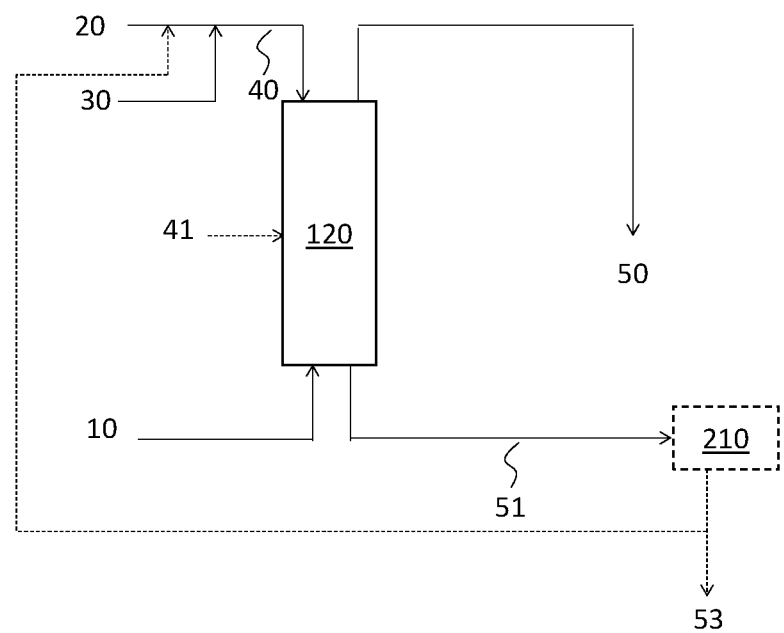
FIG. 3 is a schematic flow diagram representing another embodiment of the purification process.

In FIG. 3 an acid (30) is fed to an aqueous medium (20) to obtain an aqueous medium comprising an acid (40). Said aqueous medium comprising an acid (40) and carinata oil (10) are fed to a purification step (120), where purification and separation are carried out, suitably in an extraction column, by treating plant oil originating from a plant of the family Brassicaceae (carinata oil) (10) with said aqueous medium comprising an acid (40), optionally in the presence of steam (41). A first stream (aqueous stream) comprising impurities (51) is obtained and optionally directed to waste water treatment (210) and a second stream comprising triglycerides acids (50) is obtained. Waste water treatment (210) provides purified water (53), where at least part of it may optionally be recirculated to the aqueous medium (40).

Renewable Feedstock Comprising Triglycerides

The renewable feedstock comprising triglycerides originates from renewable or biological source or sources, and it is meant to include here feedstock other than those obtained from mineral oil or coal.

The renewable feedstock comprising triglycerides comprises at least one plant oil originating from a plant of the family Brassicaceae.

In an embodiment said plant oil comprises at least 30 wt % of C22 fatty acids, typically in the form of triglycerides.

The plant of the family Brassicaceae is selected from *Brassica juncea* (brown mustard), *Brassica carinata* (Ethipian mustard), *Brassica nigra* (black mustard), *Brassica rapa, Brassica rapa* subsp. *oleifera* (field mustard), *Brassica elongate* (elongated mustard), *Brassica nariosa* (broad-baked mustard), *Brassica rupestris* (brown mustard), *Brassica tournefortii* (Asian mustard), *Brassica napus, Brassica napus* el, *Sinapis hirta* (mustard), *Sinapis alba* (white mustard), *Sinapis arvensis, Nasturtium floridanum, Nasturtium gambellium, Nasturtium gronlandicum, Nasturtium microfullum, nasturtium officinale, Nasturtium sordidum* and combinations thereof. Preferably the plant is *Brassica carinata*.

In a preferable embodiment, the renewable feedstock comprising triglycerides, comprises *Brassica carinata* plant oil (carinata oil).

The characterization of water-degummed carinata oil is presented in Table 1 below, where typical metal content, elemental composition, acid number (TAN), saponification value, water content and concentration of triglycerides are shown.

TABLE 1

Characterization of water-degummed carinata oil.

| Determination | | Method | Carinata oil |
|---|---|---|---|
| Metal composition | | | |
| Calcium | mg/kg | ASTM D 5185 | 182 |
| Iron | mg/kg | ASTM D 5185 | 2 |
| Potassium | mg/kg | ASTM D 5185 | 5 |
| Magnesium | mg/kg | ASTM D 5185 | 34 |
| Manganese | mg/kg | ASTM D 5185 | 1 |
| Sodium | mg/kg | ASTM D 5185 | <1 |
| Phosphorous | mg/kg | ASTM D 5185 | 223 |
| Silicon | mg/kg | ASTM D 5185 | 12 |
| Elemental composition | | | |
| Carbon | % | ASTM D5291 | 77 |
| Hydrogen | % | ASTM D5291 | 12 |
| Nitrogen | mg/kg | ASTM D4629, ASTM D5762 | 39 |
| Sulphur | mg/kg | EN ISO 20846 | 29 |
| Oxygen | % | ASTM D5291 | 10 |
| Acid number (TAN) | mg/KOH/g | ASTM D664-11a | 6 |
| Saponification value | g/l | SCAN-T 12 | 1801 |
| Water content, K-F | wt % | Internal | 0.6 |
| Triglycerides, GC | wt-% | Internal | 96 |

*Brassica carinata* plant oil (carinata oil) is a non-food oil. It contains erucic acid ($C_{22}H_{42}O_2$) and also glucosinolates.

Glucosinolates constitute a natural class of organic compounds that contain sulfur and nitrogen. They are derived from glucose and an amino acid. They are water-soluble anions and belong to the glucosides.

Chemical structures of erucic acid (Formula 1A) and glucosinolate (Formula 1B) are shown below.

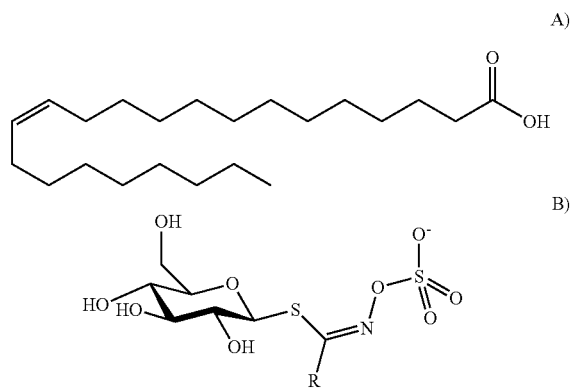

In an embodiment, the renewable feedstock comprising triglycerides, comprises 80-99.9 wt % of triglycerides.

In an embodiment, the renewable feedstock comprising triglycerides, comprises 90-99.5 wt % of triglycerides.

Plant oils originating from a plant of the family Brassicaceae, containing even high amounts of impurities, may be successfully used as feedstock in the present process.

Plant oil comprising phosphorus is typically regarded as not suitable for catalytic treatment because phosphorus is an effective catalyst poison. Phosphorous is strongly chemisorbed on the active sites of the catalyst, blocking the sites and preventing the desired catalytic reaction.

Plant oil originating from a plant of the family Brassicaceae, comprising one or more of alkali metals, alkaline earth metals, other metals, such as iron and manganese, even in low amounts is often regarded as not suitable for catalytic treatment because each of said metals is an effective catalyst poison. The alkali metals, alkaline earth metals and other metals may typically comprise Mg, Ca, K, Na, Mn and/or Fe, or a combination thereof.

In an embodiment, plant oil originating from a plant of the family Brassicaceae, comprising up to 1000 mg/kg, in total, of one or more of alkali metals, alkaline earth metals and other metals, such as iron and manganese may successfully be used as feedstock.

In another embodiment, the plant oil of the family Brassicaceae may comprise up to 600 mg/kg, in total, of one or more of alkali metals, alkaline earth metals and other metals.

In an embodiment, plant oil originating from a plant of the family Brassicaceae, comprising up to 1000 mg/kg of phosphorus, may successfully be used as feedstock. In another embodiment, the plant oil of the family Brassicaceae may comprise up to 600 mg/kg of phosphorus.

Optionally, the renewable feedstock comprising triglycerides may additionally comprise at least one other renewable feedstock.

Optionally, the renewable feedstock comprising triglycerides may comprise less than 50% by weight, suitably up to 30% by weight, preferably 0.1-30% by weight, and more preferably 0.1-25% by weight of at least one other renewable feedstock.

The other renewable feedstock typically contains varying amounts of impurities, such as metals, water, phosphorus, silicon, alkali metals, earth alkaline metals, etc.

The other renewable feedstock may originate from any renewable source, such as agricultural, wood processing industry and aqua-cultural sources.

It may originate from plants, animals, algae, fish and microbiological processes. Examples of such feedstocks are lipidic biomass feedstocks comprising acylglycerols.

In an embodiment, the other renewable feedstock is selected from the group consisting of plant oils, excluding plant oils originating from a plant of the family Brassicaceae, animal fats, fish oils, algae oils, low cost waste materials, side streams, by-products, refining waste and residues and sewage sludge, fatty acid distillates from physical refining of plant oils or animal fats, distillers corn oil (DCO) from ethanol production, acid oils, crude tall oil (CTO), waste cooking oils, lard, brown grease, trap grease, waste fats, low-grade oils, super critical water liquefaction oils (SCWL oils), pyrolysis oils, and any combinations thereof.

Acid oil refers here to acidic oil fractions obtained from the processing and/or refining of plant derived and/or animal derived fractions comprising free and/or bound fatty acids, and any combinations thereof. Acid oils are acidulated soaps, i.e. acidulated soap-stocks from chemical refining of plant material, acidulated soap-stocks from chemical refining of plant oils, acidulated soap-stocks from chemical refining of animal fats, acidulated soap-stocks from pulp production (Kraft pulp).

The other renewable feedstock does not include plant oils originating from a plant of the family Brassicaceae.

In an embodiment, plant oil originating from a plant of the family Brassicaceae is treated together with at least one other renewable feedstock selected from the group consisting of plant oils, fish oils, animal fats, algae oils, waste cooking oils, lard, brown grease, trap grease, waste fats, low-grade oils, and any combination thereof with the aqueous medium.

All the above defined other renewable feedstocks share the same characteristics in the sense that they contain very varying amounts and types of impurities.

Purification

One aspect is a process for purifying renewable feedstock comprising triglycerides, where said process comprises the steps, where the renewable feedstock comprising triglycerides comprises at least one plant oil originating from a plant of the family Brassicaceae, and said renewable feedstock comprising triglycerides is treated with an aqueous medium, at a temperature from 140 to 195° C., under a pressure from 0.1 to 70 bar (abs), and where the ratio of the feedstock comprising triglycerides to the aqueous medium is from 1:5 to 5:1, respectively, to obtain a mixture; and a first stream comprising water and a second stream comprising triglycerides are separated from said mixture, and the second stream is obtained as purified renewable feedstock.

The renewable feedstock comprising triglycerides is subjected purification to obtain a stream comprising triglycerides (second stream) and an aqueous stream (first stream) comprising impurities. The purification process removes effectively the impurities but maintains the valuable organic compounds in the stream comprising triglycerides, without effecting hydrolysis of triglycerides to any significant extent.

The aqueous medium may comprise water, mixtures of water and steam, or mixtures of streams comprising water or water and steam, with water soluble and/or water miscible organic compounds. Said water soluble and/or water miscible organic compounds may be water soluble ketones, alcohols, aldehydes, phenols, acids etc. Suitably water is used.

Said streams comprising water may be obtained by recirculating at least part of the streams comprising water, obtained from the present process, or alternatively they may be purified water streams obtained from the waste water treatment. Up to 50% by weight of the aqueous stream may comprise recirculated water streams. The recirculated water stream may comprise not more than 1000 mg/kg of total organic carbon, preferably not more than 500 mg/kg.

The aqueous medium may comprise 90-100 wt %, preferably 93-100 wt % and particularly preferably 97-100 wt % of water.

In an embodiment the aqueous medium may comprise not more than 50 mg/kg phosphorus (P), not more than 50 mg/kg silicon (Si) and not more than 50 mg/kg of at least one of alkali metals, alkaline earth metals and metals of the groups VIIB and VIIIB of the Periodic table of elements.

In an embodiment, where recirculated streams comprising water are used, the aqueous medium may comprise not more than 3 wt % of organic compounds. In another embodiment the aqueous medium may comprise 0.01-3 wt % of organic compounds. Said water soluble and/or water miscible organic compounds may be water soluble ketones, alcohols, acids, aldehydes, phenols etc., separated in the purification. Examples of such compounds are acetone, ethanol, 1-hydroxy-2-propanone, acetic acid, propanoic acid, butanoic acid, pentanoic acid, hexanoic acid, phenol, traces of larger acid e.g. octadecanoic acids, hexadecanoic acid and glycerol.

In an embodiment, in the purification, the renewable feedstock comprising triglycerides is treated with an aqueous medium comprising an acid selected from sulfuric acid and C1-C10 organic acids.

The amount of the acid is from 0.01 to 3 wt % calculated based on the total feed to the reactor, i.e the feedstock comprising triglycerides, such as the plant oil, and the aqueous medium. The amount of the acid is calculated as 100%.

The total amount of the acid is not more than 3 wt %. Preferably the amount of the acid is 0.1-2 wt %, particularly preferably 0.5-1.5 wt %.

The C1-C10 organic acid is preferably EDTA or C1-C6 organic acid selected from citric acid, formic acid, oxalic acid, acetic acid, butyric acid, valeric acid, caproic acid and propionic acid.

In a preferable embodiment, the acid is sulfuric acid. In an embodiment, sulphuric acid having concentration of 96 wt % is used.

In an embodiment, the feedstock is treated with the aqueous medium comprising an acid, and a first stream is separated, whereby the pH of the first stream is in the range from 0 to 6.5, preferably from 0.1 to 4. In a more preferable embodiment, the pH of the first stream is from 0.1 to 3.7.

In a preferable embodiment the acid id mixed with the aqueous medium prior to mixing with the feedstock.

The low pH range particularly enables removing alkali metals, alkaline earth metals and other metals from the feedstock efficiently and rapidly.

In an embodiment, the purification is carried out at the temperature from 140 to 195° C. In a preferable embodiment, the purification is carried out at the temperature from 140 to 190° C. In a more preferable embodiment, the purification is carried out at the temperature from 145 to 185° C. In an even more preferable embodiment the purification is carried out at the temperature from 145 to 180° C.

In an embodiment, the purification is carried out under a pressure from 0.1 to 70 bar (abs). In a preferable embodiment, the purification is carried out under a pressure from 1 to 60 bar (abs). In a more preferable embodiment, the purification is carried out under a pressure from 3 to 60 bar (abs).

In the purification, the amount of the renewable feedstock comprising triglycerides is from 20 to 80 wt % and the amount of the aqueous medium is 80 to 20 wt %, respectively, and the ratio is from 1:5 to 5:1, respectively, and preferably from 1:1 to 3:1.

The purification may be carried out as a batch process or a continuous process.

The purification may be carried out in any suitable reactor or reactor configuration, such as batch reactor, plug-flow reactor, stirred tank reactor, a reactor tower, column reactor, or countercurrent extraction column.

In an embodiment, the purification is carried out as a continuous countercurrent process, suitably using an extraction column. For larger industrial scale or commercial scale, the purification of the oils is preferably carried out in a continuous mode.

In an embodiment, the residence time in the purification is from 10 min to 12 hours. In another embodiment, the residence time is from 15 min to 3 hours. In a preferable embodiment, the residence time is from 30 min to 2 hours.

An aqueous stream (first stream) comprising impurities and a stream comprising triglycerides (second stream) are separated from the purification. The purification and separation may be carried out simultaneously, for example using an extraction column, or alternatively with any suitable method based on gravitational separation or separation by centrifugal force. Examples of suitable separation devices are separation vessels, decantation vessels, decanters and disk stack centrifuges.

The second stream comprising triglycerides may also comprise fatty acids and/or unsaponifiables, such as sterols, carotenes, etc., depending of the composition of the feedstock.

The aqueous stream (first stream) typically comprises P, Si, alkali metal, alkaline earth metal and other metal impurities, and some water-soluble or water-miscible organic compounds. Said organic compounds may be water soluble ketones, alcohols, aldehydes, phenols, acids etc. Examples of such compounds are acetone, ethanol, 1-hydroxy-2-propanone, acetic acid, propanoic acid, butanoic acid, pentanoic acid, hexanoic acid, phenol, traces of larger acid e.g. octadecanoic acids, hexadecanoic acid and glycerol.

In an embodiment, at least part of the aqueous stream (first stream) is recirculated to the aqueous medium, whereby the amounts of waste water streams can be reduced. Alternatively, the aqueous stream may be directed to waste water treatment to provide treated (purified) water, and at least part of the treated water obtained from the waste water treatment is recirculated to the aqueous medium.

The process may be carried out under inert atmosphere, using suitably $N_2$ or $CO_2$ atmosphere.

The water used in the aqueous medium is suitably de-aerated and demineralized or softened prior to introducing to the purification.

In an embodiment, steam may be used for providing energy to the purification, for improving mixing in the purification vessel, replacing part of the water in the aqueous medium and for maintaining the temperature. Steam may be introduced in the purification step.

The feed rate of steam is up to 500 kg/t feed, suitably 30-500 kg/t feed, more suitably 50-500 kg/t feed of steam is used and particularly suitably 50-400 kg/t feed. Steam is suitably injected at least to one location of the purification vessel/reactor. If the vessel/reactor is arranged vertically the steam is injected suitably to the bottom, or to the middle of the vessel/reactor or to the top of the vessel/reactor. The steam can also be injected to two locations or to the at least three locations: to the bottom, middle and top of the Vessel/reactor, for providing rapidly sufficient heat to the mixture. Steam provides additionally mixing of the reaction mixture.

The purification is suitably operated such to maintain the triglyceride structure of the feedstock and to avoid hydrolysis of triglycerides to glycerol as a by-product. Any glycerol formed as by-product is removed with the aqueous stream comprising impurities.

In the purification, phospholipids are selectively hydrolysed whereby the phosphorus can be found in the aqueous phase and the liberated fatty acid in the oil phase.

Optionally, at least part of the first stream is recirculated to the aqueous medium, for use in the purification of the feedstock. Optionally the recirculated first stream is subjected to a waste water treatment step in a waste water treatment plant for removing at least part of the impurities, prior to introducing to the recirculation.

In an embodiment, the second stream may be directed to drying for removing residual water in the oil. Drying may be carried out using any suitable drying apparatus, such as decantation, gravitational separation, centrifugation, evaporation apparatus etc.

Optional Hydroprocessing Step

The stream comprising triglycerides or alternatively the stream comprising triglycerides, which has been subjected to drying can be subjected to a catalytic hydrotreatment where it is converted in the presence of Hz, suitably using conventional catalysts into mainly a diesel fraction that can be used as a renewable diesel or a diesel component. Depending on the cracking activity of the hydrotreatment catalyst, a gasoline fraction may also be produced that can be used as a bio-naphtha component or as raw material for bio-plastics.

The hydroprocessing step may be carried out for effecting at least one of hydrodeoxygenation, hydrodewaxing, hydroisomerization, hydrocracking, hydrode-aromatization and ring opening reactions.

In an embodiment, the second stream comprising triglycerides, or the dried second stream, may be subjected to a catalytic hydroprocessing step carried out in the presence of hydrogen, to yield an effluent. Said effluent may be subjected to a fractionation and/or further processing steps for providing liquid fuels and other chemicals.

Hydroprocessing may be performed using one or more hydroprocessing catalysts comprising one or more metals selected from Group VIA and Group VIII metals (Periodic Table of Elements). Particularly useful examples are Mo, W, Co, Ni, Pt and Pd. The catalyst(s) can also contain one or more support materials, for example zeolite, alumina ($Al_2O_3$), gamma-alumina, zeolite-alumina, alumina-silica ($SiO_2$), $ZrO_2$, alumina-silica-zeolite and activated carbon. Suitably a mixture of CoO and MoO3 (CoMo) and/or a mixture of NiO and MoO3 (NiMo), and/or a mixture of Ni, Mo and Co and/or NiW and one or more support materials selected from zeolite, alumina, silica, zeolite-alumina, alumina-silica, alumina-silica-zeolite and activated carbon. Also, noble metals, such as Pt and/or Pd dispersed on gamma-alumina may be used.

In an embodiment, the hydroprocessing is carried out under a pressure of 5-300 bar (total pressure, abs). In an embodiment, the pressure in the hydroprocessing is from 30 to 250 bar, suitably from 30 to 120 bar.

In an embodiment, hydrogen partial pressure is maintained in the range from 50 to 250 bar, suitably from 80 to 200 bar, particularly suitably from 80 to 110 bar.

The hydroprocessing is carried out at a temperature in the range of 100 to 450° C., suitably 280° C. to 450° C., more suitably from 350° C. to 400° C.

The hydroprocessing feed rate WHSV (weight hourly spatial velocity) of the feedstock oil is proportional to an amount of the catalyst. The WHSV of the feed material varies between 0.1 and 10, it is suitably in the range of 0.1-5 and preferably in the range of 0.3-0.7.

The ratio of H2/feed varies between 600 and 4000 Nl/l, suitably of 1300-2200 Nl/l.

The feed is pumped to the hydroprocessing reactor at a desired speed. Suitably the feed rate LHSV (liquid hourly space velocity) of the feed material is in the range of 0.01-10 $h^{-1}$, suitably 0.1-5 $h^{-1}$.

The hydroprocessing step may be carried out as at least one step or as at least two-step process.

The liquid hydrocarbon stream obtained from the hydroprocessing includes fuel grade hydrocarbons having a boiling point of at most 380° C. according to ISO EN 3405. The person skilled in the art is able to vary the distilling conditions and to change the temperature cut point as desired to obtain any suitable hydrocarbon product, boiling suitably in the transportation fuel ranges.

The purification process provides several advantageous effects.

The benefits of this process are that it is able to remove particularly effectively phosphorus and alkali metals, alkaline earth metals and other metals from plant oils originating from a plant of the family Brassicaceae, which contain long chain erucic acid and glucosinolates, in addition to impurities, without producing waste water streams containing significant amounts of dissolved BOD/COD (glycerol), without breaking or degrading valuable feed materials or without effecting hydrolysis of triglycerides, or at least maintaining said hydrolysis on a very negligible level.

Furthermore, it has a high yield compared to processes utilizing degumming, bleaching, centrifugation and/or absorption in purification. Particularly the carbon yield is high, typically at least 99%, preferably at least 99.5%, indicating that very low amounts of organic compounds are lost in the purification process. Typically, the carbon yield varied between 99.5 and 99.8%.

Release of phosphorus in the atmosphere by burning or dumping in the environment can be avoided.

With the purification process, purified feedstock comprising triglycerides is provided, having low contents of P, alkali metals, alkaline earth metals and other metals. Said purified feedstock is particularly suitable as feedstock for catalytic hydroprocessing, where poisoning and inactivation of the catalysts and phosphorus promoted harmful side reactions in the hydrorocessing and during storage of the feedstock can be avoided.

The simple and cost-effective purification process allows the use of flexible feedstocks comprising plant oils originating from a plant of the family Brassicaceae and impurities, and the separation of the phases after the purification is easy and economic.

Recycling of the aqueous phase decreases the amount of needed fresh water.

EXAMPLES

Examples 1-4

The purification of carinata oil, comprising triglycerides was carried out in 4 examples as described below.

The purification of carinata oil (oil) was performed in a 100-ml batch reactor. Carinata oil was mixed at room temperature with the aqueous medium (distilled water). The mixture (oil:water in a ratio of 1:1) was introduced into the reactor, and then the heating and mixing was started. Sulphuric acid (1 wt % based on the total reaction mixture) was added to water prior to mixing with the oil, in examples 2 and 4. When the desired temperature of 150-180° C. was reached, the reaction was initiated, and the reaction mixture was kept at said temperature for the desired amount of time (residence time 1 h). The reactor was cooled, a gas sample was taken and analyzed with GC, and two liquid samples were collected from the reactor for analysis: the oil phase and the aqueous phase. Total organic carbon (TOC) and pH were measured for the aqueous phase (water phase). The concentration of alkali metals, alkaline earth metals and other metals was measured (ICP) (ICP=Inductively Coupled Plasma) for the oil phase together with the amount of water dissolved in the oil after the test (Karl-Fisher).

The experimental results of tests 1-4 are presented in Table 2 below. Carinata oil was purified with water, the ratio of oil:water was 1:1, temperature was 150-180° C., and the tests were carried out with and without 1 wt % $H_2SO_4$ addition. Reaction time (residence time) was 1 h.

The results demonstrate that temperature has a beneficial effect on the purification of the carinata oil (crude carinata oil). At the highest temperature tested (180° C.) a significant removal of alkali metals, alkaline earth metals and other metals can be seen.

The addition of $H_2SO_4$ to the purification improves the purification, specially the removal of alkali metals, alkaline earth metals, other metals and phosphorous.

The solubility of water in the oil is low as presented in Table 2 (water content 0.2-0.6 wt-%), indicating that at least in some cases drying of the oil is only an optional measure.

TABLE 2

| Purification of crude carinata oil (=oil) | | | | | |
|---|---|---|---|---|---|
| | OIL FEED | EX. 1 OIL:WATER 1:1 T = 150° C. | EX. 2 OIL:WATER 1:1 T = 150° C. 1 WT % $H_2SO_4$ | EX. 3 OIL:WATER 1:1 T = 180° C. | EX. 4 OIL:WATER 1:1 T = 180° C. 1 WT-% $H_2SO_4$ |
| Oil phase | | | | | |
| Metals (mg/kg) | 223 | 40 | 0.1 | 9 | 0.1 |
| P (mg/kg) | 223 | 40 | 37 | <1 | <1 |
| Water content (wt %) | 0.2 | 0.6 | 0.2 | 0.3 | 0.3 |
| Aqueous phase | | | | | |
| pH | | 5 | 1 | 5 | 1 |
| Total organic carbon (mgC/kg) | | 204 | 333 | 170 | 331 |

* metals include alkali metals, alkaline earth metals and metals of the groups VIIB and VIIIB of periodic table of elements Based on the TOC results of the aqueous phase (water phase) it can be concluded that some organic compounds were dissolved in the aqueous phase. However, as carinata oil mainly comprises triglycerides formed of C22 fatty acids, the number of light compounds that can dissolve in water is water is very limited, as indicated by the less than 400 ppm of TOC in the aqueous phase. The concentration of organic compounds dissolved has not affected by the increase in the purification temperature or with the addition of sulfuric acid.

At the conditions tested some hydrolysis of the triglyceride takes place, however this is not significant. The results presented in the Table 2 shows that the addition of acid enhances, particularly at the temperature of 180° C. the removal of metals.

Sulfuric acid is particularly suitable. Also, as the pH of the aqueous phase after the purification procedure with sulfuric acid is low, this aqueous phase can be recirculated reducing the amount of fresh water and acid needed.

The present invention has been described herein with reference to specific embodiments. It is, however, clear to those skilled in the art that the process(es) may be varied within the bounds of the claims.

The invention claimed is:

1. A process for purifying renewable feedstock comprising triglycerides, where said process comprises the steps, where the renewable feedstock comprising triglycerides comprises at least one plant oil originating from a plant of the family Brassicaceae, and said renewable feedstock comprising triglycerides is treated with an aqueous medium, at a temperature from 140 to 195° C., under a pressure from 0.1 to 70 bar (abs), and where the ratio of the feedstock comprising triglycerides to the aqueous medium is from 1:5 to 5:1, respectively, to obtain a mixture, and a first stream comprising water and a second stream comprising triglycerides are separated from said mixture, and the second stream is obtained as purified renewable feedstock.

2. The process according to claim 1, wherein the plant of the family Brassicaceae is selected from Brassica juncea, Brassica carinata, Brassica nigra, Brassica rapa, Brassica rapa subsp. oleifera, Brassica elongate, Brassica nariosa, Brassica rupestris, Brassica tournefortii, Brassica napus, Brassica napus el, Sinapis hirta, Sinapis alba, Sinapis arvensis, Nasturtium floridanum, Nasturtium gambellium, Nasturtium gronlandicum, Nasturtium microfullum, Nasturtium officinale, Nasturtium sordidum and combinations thereof.

3. The process according to claim 1, wherein the purified renewable feedstock comprises not more than 50 mg/kg phosphorus, phosphorus, calculated as elemental phosphorus.

4. The process according to claim 1, wherein the purified renewable feedstock comprises not more than 50 mg/kg alkali metals, alkaline earth metals, metals of the groups VIIB and VIIIB of the Periodic table of elements, or combinations thereof, calculated as elemental metals.

5. The process according to claim 1, wherein the first stream comprising water comprises not more than 2000 mg/kg total organic carbon.

6. The process according to claim 1, wherein the purified renewable feedstock comprises not more than 50 mg/kg phosphorus and not more than 50 ppm alkali metals, alkaline earth metals, metals of the groups VIIB and VIIIB of the Periodic table of elements, or combinations thereof and the first stream comprising water comprises not more than 2000 mg/kg total organic carbon.

7. The process according to claim 1, wherein the aqueous medium comprises 0.01 to 3 wt % of an acid selected from sulfuric acid and C1-C10 organic acids, calculated on the total feed.

8. The process according to claim 7, wherein the C1-C10 organic acid is EDTA or C1-C6 organic acid selected from citric acid, formic acid, oxalic acid, acetic acid, butyric acid, valeric acid, caproic acid and propionic acid.

9. The process according to claim 7, wherein the acid is sulphuric acid.

10. The process according to claim 1, wherein the renewable feedstock comprising triglycerides comprises less than 50 wt % of at least one other renewable feedstock.

11. The process according to claim 10, wherein the other renewable feedstock is selected from the group consisting of feedstock is selected from the group consisting of plant oils, excluding plant oils originating from a plant of the family Bras sicaceae, animal fats, fish oils, algae oils, low cost waste materials, side streams, by-products, refining waste and residues and sewage sludge, fatty acid distillates from physical refining of plant oils or animal fats, acid oils, distillers corn oil from ethanol production, crude tall oil, waste cooking oils, lard, brown grease, trap grease, waste fats, low-grade oils, super critical water liquefaction oils, pyrolysis oils, plant oils, and any combinations thereof.

12. The process according to claim 1 wherein the aqueous medium is selected from water, mixtures of water and steam, and mixtures of streams comprising water or water and steam, with water soluble and/or water miscible organic compounds.

13. The process according to claim 1, wherein the aqueous medium comprises not more than 3 wt % of organic compounds.

14. The process according to claim 1, wherein the temperature is from 140 to 190° C.

15. The process according to claim 1, wherein the pressure is from 1 to 60 bar (abs).

16. The process according to claim 1, wherein the residence time is from 10 min to 12 hours.

17. The process according to claim 1, wherein the pH of the first stream is in the range from 0 to 6.5.

18. The process according to claim 1, wherein at least part of the first stream is recirculated to the aqueous medium.

19. The process according to claim 1, wherein the carbon yield is at least 99%.

20. The process according to claim 1, wherein the plant of the family Brassicaceae is Brassica carinata.

21. The process according to claim 1, wherein the purified renewable feedstock comprises not more than 10 mg/kg phosphorus, calculated as elemental phosphorus.

22. The process according to claim 1, wherein the purified renewable feedstock comprises not more than 10 mg/kg alkali metals, alkaline earth metals, metals of the groups VIIB and VIIIB of the Periodic table of elements, or combinations thereof, calculated as elemental metals.

23. The process according to claim 1, wherein the temperature is from 145 to 185° C.

24. The process according to claim 1, wherein the residence time is from 15 min to 3 hours.

25. The process according to claim 1, wherein the pH of the first stream is in the range from 0.1 to 4.

26. The process according to claim 1, wherein the carbon yield is at least 99.5%.

* * * * *